United States Patent
Goldsmith

(10) Patent No.: US 7,110,597 B2
(45) Date of Patent: Sep. 19, 2006

(54) CORRECTING DIGITAL IMAGES USING UNIQUE SUBJECTS

(75) Inventor: Michael A. Goldsmith, Lake Oswego, OR (US)

(73) Assignee: Intel Corporation, Santa Clara, CA (US)

( * ) Notice: Subject to any disclaimer, the term of this patent is extended or adjusted under 35 U.S.C. 154(b) by 870 days.

(21) Appl. No.: 10/100,835

(22) Filed: Mar. 18, 2002

(65) Prior Publication Data

US 2003/0174215 A1    Sep. 18, 2003

(51) Int. Cl.
*G06K 9/00*    (2006.01)

(52) U.S. Cl. ............... 382/167; 382/118; 382/190; 382/274

(58) Field of Classification Search ............... 382/118, 382/167, 190, 274; 358/461, 518, 520
See application file for complete search history.

(56) References Cited

U.S. PATENT DOCUMENTS

| | | | | |
|---|---|---|---|---|
| 5,296,945 A | * | 3/1994 | Nishikawa et al. | 358/518 |
| 5,719,661 A | * | 2/1998 | Terashita | 355/38 |
| 6,256,062 B1 | * | 7/2001 | Endo | 348/223.1 |
| 6,674,898 B1 | * | 1/2004 | Herman | 382/167 |
| 6,678,407 B1 | * | 1/2004 | Tajima | 382/167 |
| 2002/0131652 A1 | * | 9/2002 | Yoda | 382/309 |

OTHER PUBLICATIONS

Margulis, D., "Professional Photoshop: The Classic Guide to Color Correction", 2001,Chapter 2 entitled, "Color Correction by the Numbers", pp. 21-40.

* cited by examiner

*Primary Examiner*—Jingge Wu
*Assistant Examiner*—Yubin Hung
(74) *Attorney, Agent, or Firm*—Blakely, Sokoloff, Taylor & Zafman LLP

(57) ABSTRACT

A method and apparatus for correcting digital images is provided. In one embodiment of the invention, a unique subject in a current image to be corrected is identified in one or more reference images. Pixel characteristics of the unique subject in the current image to be corrected are compared to the pixel characteristics of the unique subject as it appears in the one or more reference images. Using the comparison, a systemic error of the current image is inferred, and a correction function correcting the inferred error is determined. One embodiment of the invention corrects the color of a digital image based on identifying individual humans in the current image and in the reference images.

12 Claims, 4 Drawing Sheets

CORRECTING DIGITAL IMAGES USING UNIQUE SUBJECTS

BACKGROUND OF THE INVENTION

1. Field of the Invention

An embodiment of the present invention applies to the field of digital photography and, in particular, to correcting digital images.

2. Description of the Prior Art

Digital photography is the process of capturing, processing, and rendering images digitally. Digital representation of images, which means that images are represented by a finite number of pixels (Picture Elements) where each pixel can assume a finite number of values, is well known in the art. Capturing digital images by using, for example, digital cameras or scanners is also well known. One advantage of digital photography over traditional analog photography is that a general-purpose computer, or specialized circuit, can process the images captured digitally. Such processing may include color correction, redeye removal, intentional distortion to create "special" effects, and changing or correcting various other characteristics of the image.

One characteristic of a digital image that may need correcting is color. Color correcting involves a user manipulating the image, with or without automatic calculations by a computer, to make the colors on the image closer to what the user is looking for. There are several color-correcting schemes known in the art.

One such scheme requires that the user identify an object with a known color-range in the image to be corrected. For example, the user could use a mouse to click on a portion of a digital image representing a person. The computer would then compare the skin tone colors of that person to a color-range known for human skin, that is, the usual range of colors skin takes on. For example, if skin appears blue in an image, the computer—or the person performing the correction by hand—will know that corrections must occur. Other schemes relying on general information about what certain objects, such as humans, sky, plants, and so on also exist. For example, the product known as iCorrect produced by Pictograpics uses this general type of technique.

One limitation of these techniques is that they rely on a range of colors to perform the correction, and are thus limited in accuracy by this range. For example, it is true that skin cannot be blue, but it can be a broad range between pale white and dark black. Even excluding people of African descent, it is clear that relying on the range of expected skin colors for people, or other general objects, is limited in accuracy.

However, the range of colors for a specific person, or specific object, does not vary quite as much. For example, the skin tone of an individual varies much less than the skin range within even a single ethnicity of people. Furthermore, most of the variation in color for individual people is seasonal. The prior art schemes have not exploited this, and no correction scheme relies on specific and unique subjects in images, such as a specific person, or a specific tree, for digital image correction.

BRIEF DESCRIPTION OF THE DRAWINGS

The invention may best be understood by referring to the following description and accompanying drawings that are used to illustrate embodiments of the invention. Embodiments of the present invention are illustrated by way of example, and not by way of limitation, in the figures of the accompanying drawings in which like reference numerals refer to similar elements and in which.

DETAILED DESCRIPTION

In general, embodiments of the present invention exploit the fact that unique picture subjects, such as people, should have the same color, or other picture characteristics, from one image to the next. Thus, the fact that skin tones of individual people are generally consistent is used to correct a digital image. Some embodiments of the present invention use facial recognition technology and image archiving to automate various aspects of the correction process.

A digital image is represented by a matrix of pixels. Each pixel is associated with a number representing the brightness intensity of the pixel. Each pixel is represented by a set of bits in memory, and is able to take on various discrete brightness levels. Digital images generally use three or four bytes to represent a colored pixel, with each byte representing the intensity of a channel. Each channel is a different color or other measurement needed to express color. How many channels a pixel has and what the channels represent depends on the colorspace used by the color representation scheme.

For example, the RGB (red-green-blue) colorspace uses three color channels. In the RGB colorspace the color of each pixel is determined by the intensity of the red, green, and blue channels in each pixel. Generally, three bytes are used to store this information—one byte per channel—although more or less memory may be used depending on how many discrete intensities are desired for each color channel. Using one byte per channel results in each channel being able to assume 256 discrete brightness levels.

To represent a shade of purple in the RGB colorspace, the intensity of each channel—i.e. color component—would be set so that the combined visual output on rendering would appear purple to the healthy human eye. For purple, the intensity of the red and blue channels will likely be greater than the green channel. For example, the shade of purple may be represented as channel intensities (200, 50, 220).

Such a specific color is known as a vector in the colorspace. Other colorspaces, such as the HSV (hue-saturation-value) colorspace and the CMYK (cyan-magenta-yellow-black) colorspace, are also known in the art. Embodiments of the invention are thus applicable to any colorspace, known or yet to be developed. However, for simplicity, most of the discussion below will assume using the RGB colorspace.

Since the color of a pixel is represented by a vector in the colorspace, the color of a pixel will be hereinafter treated as a single value, such as an m-vector. In the case of three channels per colored pixel with one byte of memory per channel, each pixel could take on $256_3$ (16,777,216) discrete colors. One skilled in the art understands that adjusting or correcting color means changing the color values for individual colored pixels from one color among the over 16 million possibilities of the colorspace, to another color, according to some scheme or technique.

Figure 1:
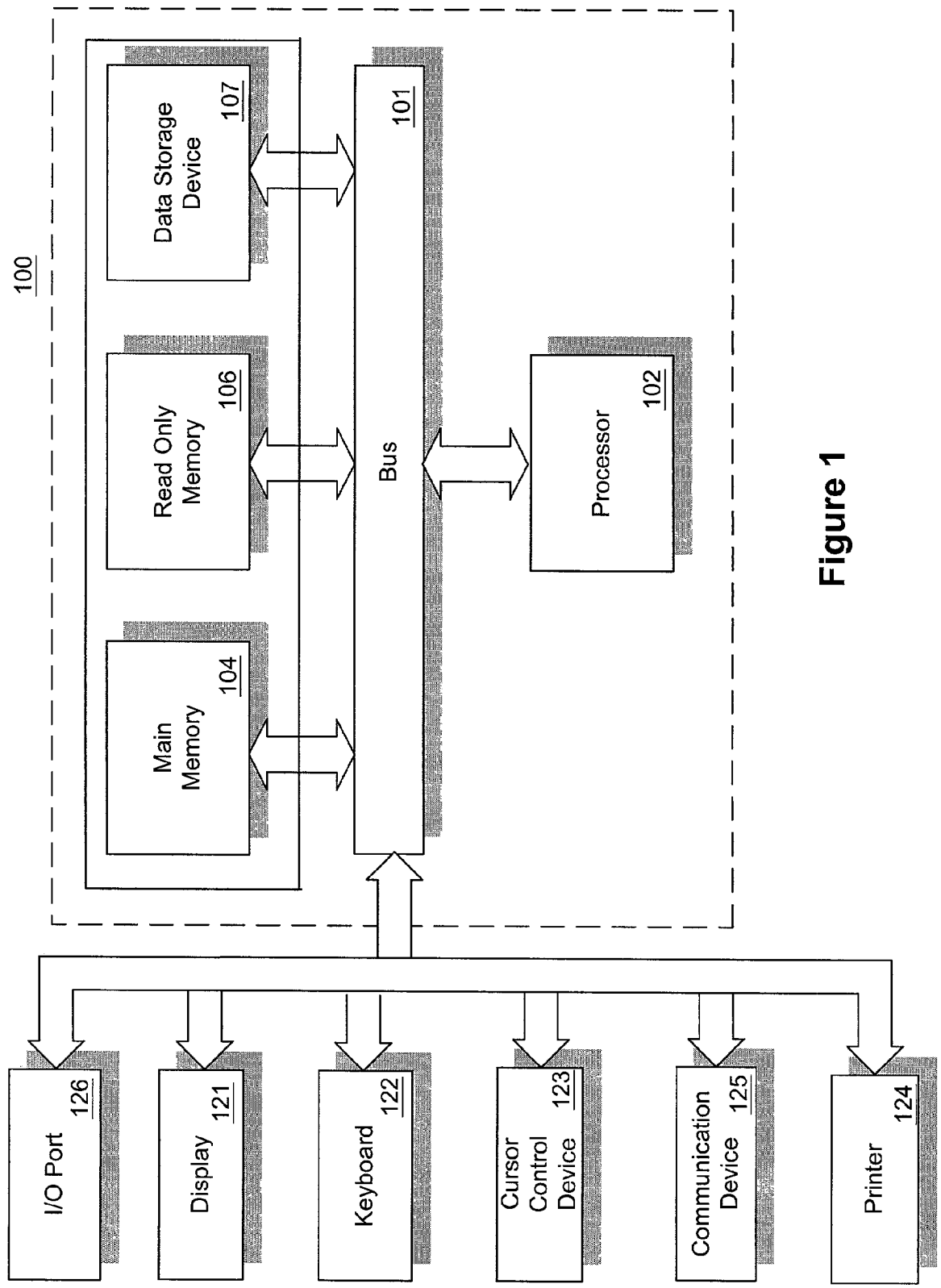
FIG. 1 is an exemplary computer system on which embodiments of the present invention may be practiced.

A computer system in which features of the present invention may be implemented will now be described with reference to FIG. 1. In one embodiment of the present invention, computer system 100 may be a personal computer. In alternate embodiments of the invention, certain features of the computer system 100 needed to carry out embodiments of the invention may be incorporated into a specialized device, such as a digital camera, a scanner, or any other digital device. In yet alternative embodiments of the invention, certain aspects of the present invention may be carried out on a specialized device while other aspects may be carried out on a general purpose computer coupled to the device. In another embodiment of the invention, computer system 100 may be resident on a specialized device, such as a digital camera.

Computer system 100 comprises a bus or other communication means 101 for communicating information, and a processing means such as processor 102 coupled with bus 101 for processing information. In one embodiment of the invention, the tasks performed to practice embodiments of the invention as performed by the processor 102 either directly or indirectly.

Computer system 100 further comprises a random access memory (RAM) or other dynamic storage device 104 (referred to as main memory), coupled to bus 101 for storing information and instructions to be executed by processor 102. Main memory 104 also may be used for storing temporary variables or other intermediate information during execution of instructions by processor 102. In one embodiment of the invention, images accessed by the invention are stored digitally on the main memory 104 during certain intervals while the invention is practiced. Computer system 100 also comprises a read only memory (ROM) and/or other static storage device 106 coupled to bus 101 for storing static information and instructions for processor 102.

A data storage device 107 such as a magnetic disk or optical disc and its corresponding drive may also be coupled to bus 101 for storing information and instructions. In one embodiment of the invention, images accessed by the invention are stored on a data storage device 104 during certain intervals while the invention is practiced. Computer system 100 can also be coupled via bus 101 to a display device 121, such as a cathode ray tube (CRT) or Liquid Crystal Display (LCD), for displaying information to a computer user. In one embodiment of the invention, the images accessed by the invention are displayed on the display device 121, and the color correcting occurs in the colorspace used by the display device 121. Computer system 100 can also be coupled via bus 101 to a printing device 124, such as a laser printer, or any other printer. The printer 124 may be a color or a black and white printer. In one embodiment of the invention, the images accessed by the invention may rendered on the printer 124, and the color correcting may be implemented in the printer.

Typically, an alphanumeric input device 122, including alphanumeric and other keys, may be coupled to bus 101 for communicating information and/or command selections to processor 102. Another type of user input device is cursor control 123, such as a mouse, a trackball, a joystick, or cursor direction keys for communicating direction information and command selections to processor 102 and for controlling cursor movement on display 121.

A communication device 125 is also coupled to bus 101 for accessing remote servers or other servers via the Internet, for example. The communication device 125 may include a modem, a network interface card, or other well-known interface devices, such as those used for coupling to an Ethernet, token ring, or other types of networks. In any event, in this manner, the computer system 100 may be coupled to a number of clients and/or servers via a conventional network infrastructure, such as a company's Intranet and/or the Internet, for example. In one embodiment of the invention, images accessed by the invention are stored digitally on the Internet, or any machine accessible by communication device 125 during certain intervals while the invention is practiced. In another embodiment of the invention, images accessed by the invention are stored on a specialized device, such as a digital camera, coupled to the bus 101 via an input/output port 126 during certain intervals while the invention is practiced. Embodiments of the invention are applicable to all digital images regardless of the medium used for their storage.

Demonstrative Example

Figure 2:
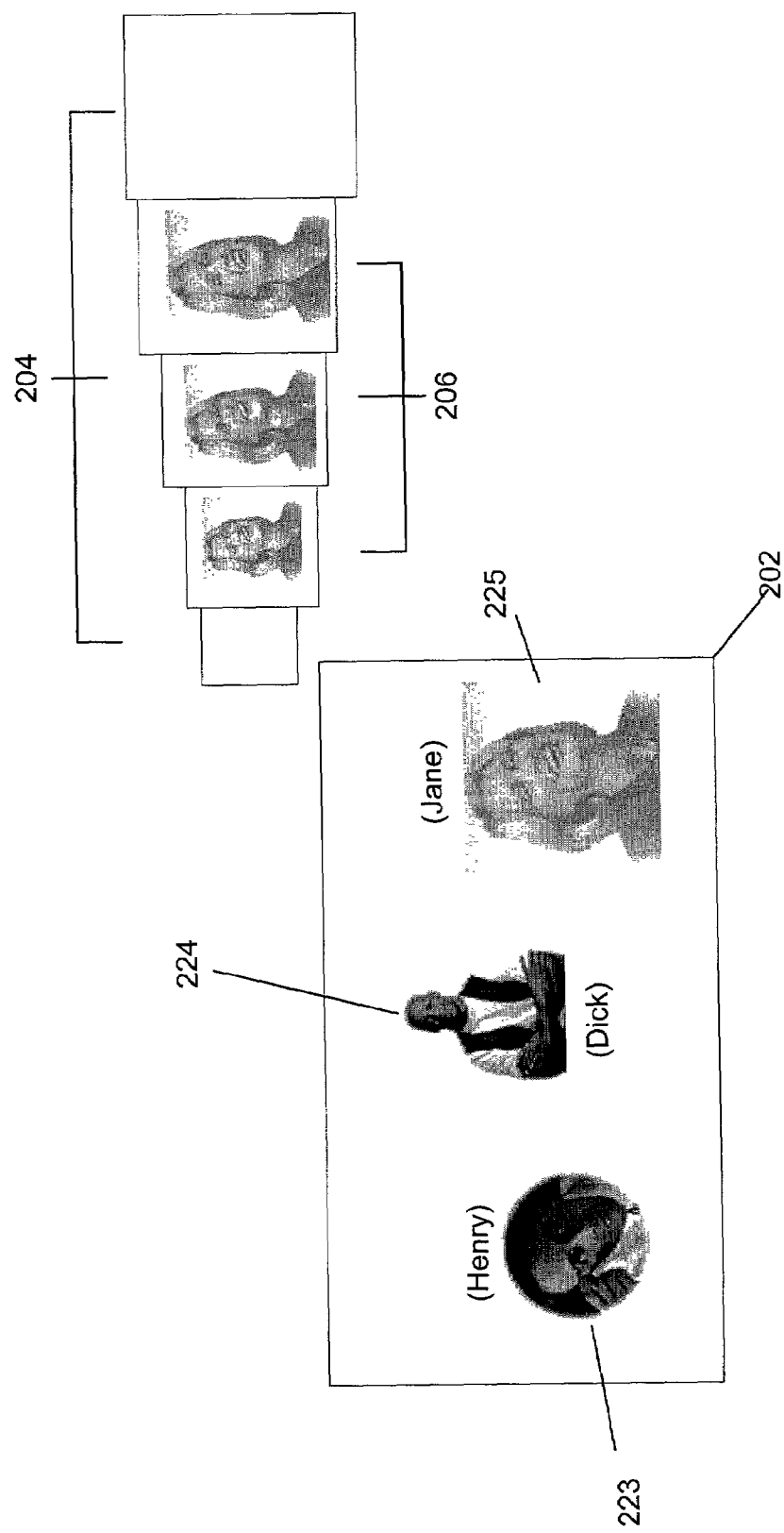
FIG. 2 is a representation of digital images that may be used by various embodiments of the present invention.

The following embodiments of the present invention are set forth to demonstrate the present invention. In these embodiments, the invention is implemented by focusing on the uniqueness of humans in correcting the color of digital images. These embodiments of the invention are used to correct the color of an image 202 in FIG. 2. The image 202 may have been captured by a digital camera, or any other means, and may be stored in a memory element, such as main memory 104, or fixed in some other medium. Image 202 depicts Harry 233, Dick 224, and Jane 225, three hypothetical humans. In FIG. 2, only representations of the three people are used. In an actual image, it is contemplated that the three people could be sharing the same physical space and interacting, like people in most photographs do.

Jane 225 may be identified as a unique human individual using a known, or yet to be developed, facial-recognition technique or scheme. Generally, the facial recognition process will have access to another image, or several images, in which Jane 225 is identified as such, but this may not be necessary with all facial recognition schemes. For example, the recognition scheme may be preprogrammed with Jane's unique recognizable characteristics. Alternatively, a user may manually identify Jane 225 in the image 202, for example by clicking a mouse on Jane's face and associating the input with the word "Jane" in a database.

Once Jane 225, or any other person in the image to be corrected who is recognizable by the scheme, is identified, a search for Jane 225 in the library of images 204 may be performed. These images 204 may be stored in main memory 104 or read only memory 106 and accessible by processor 102. That is, using a facial recognition technique, presumptively color-correct images depicting Jane 225 that may be used as a reference in color correcting may automatically be found.

In FIG. 2 these images 206 containing Jane 225 show only representations of Jane. In an actual image library, it is contemplated that these images 206 may include Jane in a variety of settings with a variety of other people and objects. Furthermore, a user may manually choose the images 206 from the image library 204 that depict Jane 225, and manually identify Jane 225 within those images.

Once previous instances of Jane 225 depicted in images other than the image 202 are identified and selected, one or more depictions of Jane 225 that are presumptively color-correct are chosen, and the color of Jane's skin color is calculated. If more than one reference images 206 are chosen, the calculated skin color may be an average skin color. This average may be a weighted average based, for example, on picture quality, user input, the capture date of the images, or some other factor.

The selection of appropriate reference images may be based on a comparison of the dates of the reference images with the date of the image 202 to be corrected, if available. For example, if the image 202 to be corrected was captured in June, and the three images 206 in which Jane 225 appears are dated from December, January and August respectively, then using the August image may result in more accurate color correction, since it is likely that Jane's skin tone is different in the summer than in the winter. Thus, the selection or weighing of the reference images may be based on the capture dates of the respective images.

If a single reference image is used, adjustments may be made to the reference skin tone based on a comparison of the capture dates of the reference image and the image to be corrected. In some embodiments of the invention, a skin sample database may be kept to track seasonal changes in individuals used in color correction. Iterative methods may also be used to guess at skin tones between known extremes for certain individuals. While these approaches use skin tone ranges, these ranges are for specific individuals, not for all people in general.

In one embodiment of the invention, Jane's skin color may be calculated by selecting a subset of pixels used in depicting Jane 225 in the current image to be corrected 202 and averaging the color values of those pixels. Care should be taken that pixels used in this calculation all depict Jane's skin. To do this, statistical outliers values in color may be discarded. Furthermore, the pixel selection scheme may use facial data gathered by the facial recognition scheme to ensure that the pixels selected are not from eyes, lips, facial hair, or other non-skin colored aspects of the human face. Also, these pixels may exclude places on the face where women are likely wear makeup, such as the cheek. Where the selection of the subset is manual, the user must exercise this care. This calculated skin color is usually expressed as a vector in the colorspace.

Once Jane's presumptively correct skin color is calculated from the reference image or images, it is compared with Jane's skin color in the image 202 to be corrected. Jane's skin color in this image 202 may be calculated in any of the ways described above, or according to yet another technique. The comparison may then be used to correct the image 202. The comparison may include calculating a scalar correction vector, which when multiplied by the color vector representing Jane's skin tone in the image to be corrected 202 results in the color vector representing Jane's skin tone in the reference image. Mathematically this may be expressed as:

$$C_p * V = C_r \text{ where}$$

$C_p$ is the color vector in the colorspace calculated for Jane's skin in the image to be corrected;

$C_r$ is the color vector in the colorspace calculated for Jane's skin in the image to be corrected;

V is the scalar correction vector; and represents vector multiplication in the colorspace, i.e. the vector space. Since $C_p$ and $C_r$ are known after the calculations explained above, determining the correction vector in one embodiment of the invention can be done by:

$V = C_r / C_p$ where/represents vector division in the colorspace.

More sophisticated comparison schemes may be used. Instead of using a static correction vector, a transfer function may be determined for each channel to make a correction function. A transfer function is not a scalar multiplier like the correction vector, but is dependent on the intensity of the input. A transfer function maps the range of intensity values for a color channel into the range of intensity values for that channel.

For example, let $T_r(x)=y$ be the transfer function for red in an RGB colorspace, where the subscript r denotes the red color channel, x is a input intensity value (between 0 and 255 if one byte per channel per pixel is used), and y is the output intensity value (with the same range as x). While the values for x and y are discrete in digital photography, the transfer function can be described visually by a curve, which may look like the graph in FIG. 4.

Figure 4:
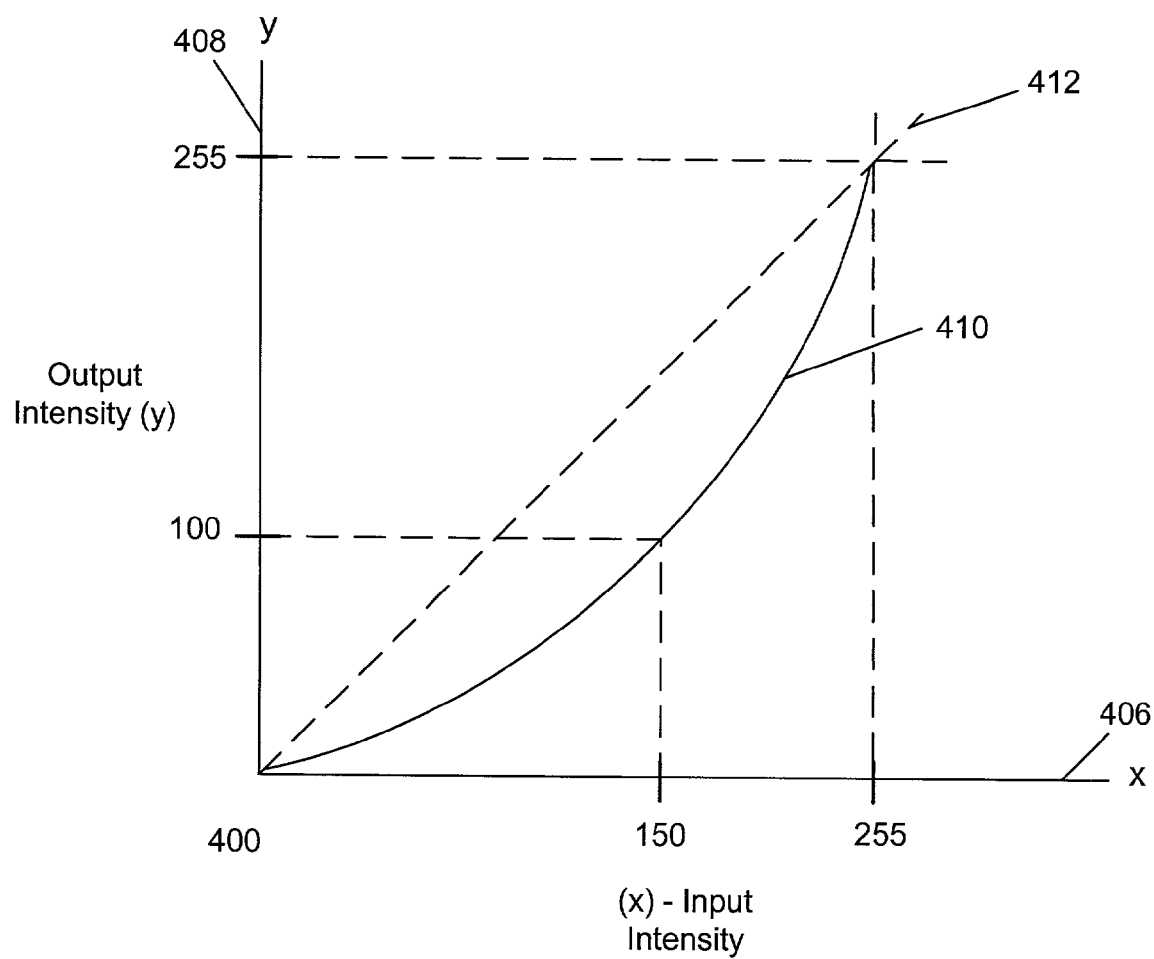
FIG. 4 is an exemplary representation of a transfer function curve for one channel as it might appear in one embodiment of the present invention.

FIG. 4 is a function graph 400 of equation 402, the equation for the red transfer function. The graph 400 includes a horizontal (x) axis that represents the input intensities, 0 to 255 in this embodiment of the invention. The graph 400 also includes a vertical (y) axis that represents the output intensities that have the same range as the input intensities. Generally the input and output ranges will be identical, but they do not have to be. The function $T_r(x)$ is graphed as curve 410.

As is understood by one skilled in the art, curve 410 determines the output (y) value an input (x) value in mapped to. For example, as shown in FIG. 4, an input intensity of 150 (x=150) is mapped to an output intensity of 100 (y=100). This is because $T_r(150)=100$. It is further understood by one skilled in the art, that the correction vector set forth above is a specific implementation of the transfer function in which the transfer functions are limited to linear functions, i.e. straight lines only for curve 410.

It is further understood by one skilled in the art, that points along the diagonal 412 for any curve 410 mean that the transfer function leaves those values unaltered. Curve 412 has no such values, except for 0 and 255. However, curve 412 may be any curve, including one with numerous, or even all, points on the diagonal 412. It is further understood by one skilled in the art, that curve 412 is merely a visual representation of the discrete-valued transfer function $T_r(x)$. How to calculate transfer functions from the pixels in the image to be corrected and the pixels in the reference image selected for image-correction would be apparent to one skilled in the art, and various known and yet to be developed methods may be used without deviating from the scope of the invention. Transfer functions for all other color channels of the colorspace can be calculated in a similar manner.

The transfer functions, correction vector, or other result of the comparison may then be used to correct the entire image 202. Alternatively, only corrects a subset of the image 202, for example only Jane's skin, may be corrected. The actual correction may be performed by multiplying the color vector of each pixel to be corrected by the correction vector. The correction may also be performed by applying the transfer functions to each channel of each pixel. Some other embodiments of the invention may use different correction techniques based on the way the correction function was obtained.

If more than one human is depicted in an image 202 to be corrected, like Harry 223 and Dick 224, their identities and skin tones may also be used for color correction in the same manner as described for Jane. Thus, alternate color-corrections for the image 202 may be produced, each alternative based on the skin tone of a different human individual depicted in both the image 202 to be corrected and in some image in the image library 204. Then, the user may choose a preferred corrected image. Alternatively, further processing, such as another known color-correction technique, may be used in combination to automatically determine the best color-correction result. Additionally, a combined correction function or vector may be determined from the individual correction functions based on each individual person.

Digital Image Correction

Figure 3:
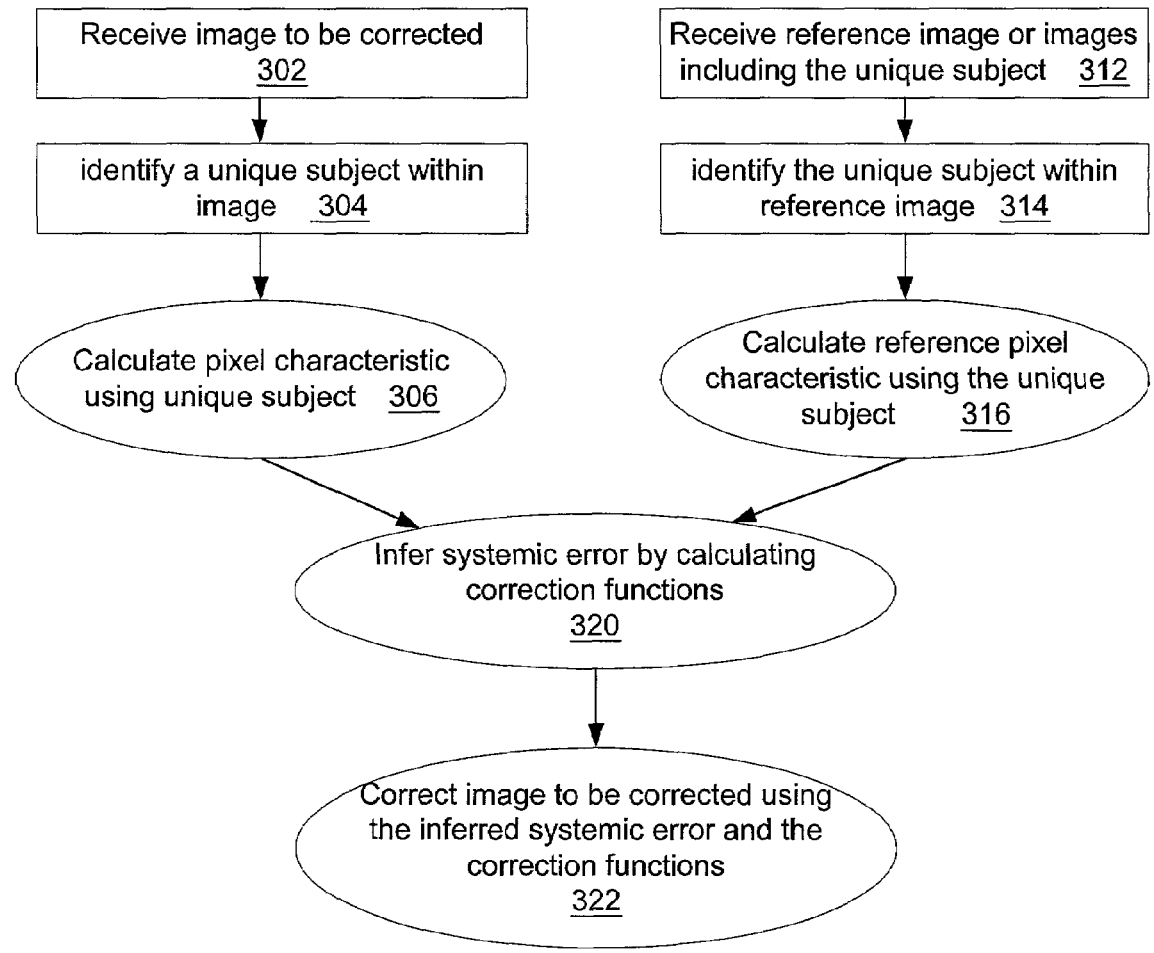
FIG. 3 is a flow chart illustrating digital image correction processing according to one embodiment of the present invention.

Digital image correction, according to some embodiments of the invention, is described more generally with reference to FIG. 3. The design of the flow chart does not necessarily imply a temporal or chronological relation between all blocks of the flow chart, it is merely to aid in understanding the embodiments of the invention described in relation thereto.

In 302, an image to be corrected is received. The image to be corrected is a digital image made up of colored pixels, where the color of each pixel is represented by a vector in a colorspace. For example, in the RGB colorspace with one byte per channel, a pure blue pixel would be represented by the vector (0,0,256) where the numbers represent the intensity of the channels. In 304, a unique subject in the image to be corrected is identified. This may be accomplished by some user input, such as selecting a chair and identifying it as "Grandma's chair." If the unique subject to be identified is a person, then the identification may be automated by using a facial recognition scheme. Other unique subjects, such as chairs, trees, shirts, and so on, may also be identified automatically. Embodiments of the invention are applicable to any automated identification technique now existing, or to be developed in the future.

In 306, a pixel characteristic for the identified unique subject is determined. For color correction, this can be accomplished by averaging the colors of a number of pixels that are used to depict the unique subject in the image to be corrected. This sample set of pixels may be user selected, or may be selected automatically building on the object recognizing technique. For example, in the case of face recognition, the technique can select a subset of pixels of the face where skin color is likely to be found. Several error control schemes may be used to ensure that the selected subset of pixels is indeed skin colored.

In other embodiments of the invention, the pixel characteristic may be more complex then color. For example, the pixel characteristic to be corrected may be pixel texture, which may not be expressed as a single vector or value. Modifications to embodiments of the present invention are apparent to those skilled in the art that would make it applicable to pixel characteristics other than color, so long as a unique reference subjects are used.

In 312, one or more reference images containing the unique subject are selected. This may be performed manually by the user. For example, the user who selected "Grandma's chair" in the image to be corrected may then select another image in which Grandma's chair appears, and identify, in 314, the chair within the image using some input mechanism such as cursor control device 123.

If a facial recognition scheme is used, reference images including the person identified in the image to be corrected can be found automatically. These images may then be displayed to the user for a selection of one or more of the possible reference images, or this selection may be automated as well. A date comparison mechanism may also be used here to select the most appropriate reference image. In 316, the reference pixel characteristic is calculated. This may be performed similarly to the pixel characteristic calculation for the unique subject discussed above, but using the reference image.

If multiple reference images are used some combining method, such as averaging, may be used to achieve a more accurate reference pixel characteristic. For example, if the unique subject is a person, and there are ten possible reference pictures, but the person was sick in two and very tan in one, the average skin color of the person will more likely resemble the accurate skin color for that person. A date comparison mechanism may also be used to aid in weighing or discarding reference images in embodiments of the invention where multiple reference images are used. User override of automated decisions can be implemented for all aspects of various embodiments of the invention to protect against errors.

When both the pixel characteristic from the image to be corrected and the reference pixel characteristic from one of more reference images are determined, they are used to infer a systemic error in the image to be corrected 320. A systemic error may be one that occurs in portions of the image to be corrected, or perhaps in the entire image. In the case of a color correction, this inference may be that the color of the image to be corrected is different from the color the image should have in the same proportion as the color of the unique subject in the image to be corrected is different from the reference color in each color channel. This comparison may then result in the correction vector or the correction transfer functions. Other ways of comparing the two pixel characteristic measurements and deriving an error function for the image to be corrected depending on speed and quality requirements in addition to the characteristic to be corrected for would be apparent to those skilled in the art.

In 322, the inferred systemic error is applied to the image to be corrected. In one embodiment of the invention, this may mean applying the transfer functions to each color channel in each pixel making up the image to be corrected. The correction may entail multiplying the color of each pixel in the image by the correction vector. The correction may only be applied to a subset of the pixels in the image to be corrected. For example, if the user is only unhappy with the color of the unique subject, the correction could be limited to those pixels used to represent the unique subject. Another way of accomplishing this result is to alter the transfer functions in such a way that applying the transfer functions on unselected portions of the image to be corrected will leave the color of that portion unaltered. Visually, the curve of each transfer function for each channel will cross the diagonal for the values representing the unselected portions to be unaltered.

Alternatively, if the user is only happy with the color of a certain portion of the image to be corrected, such as the sky, the user may select this portion to be excluded from the color correction. Alternatively, this exclusion may alter the transfer functions in such a way that applying the transfer functions to the selected portion will leave the color of that portion unaltered. Visually, the curve of each transfer function for each channel will cross the diagonal for the values representing the portions to be unaltered.

General Matters

In the description above, for the purposes of explanation, numerous specific details are set forth in order to provide a thorough understanding of embodiments of the present invention. It will be apparent, however, to one skilled in the art that embodiments of the present invention may be practiced without some of these specific details. In other instances, well-known structures and devices are shown in block diagram form.

Embodiments of the present invention include various processes. The processes of the embodiments of the present invention may be performed by hardware components, or may be embodied in machine-executable instructions, which may be used to cause a general-purpose or special-purpose processor or logic circuits programmed with the instructions to perform the processes. Alternatively, the processes may be performed by a combination of hardware and software.

Embodiments of the present invention may be provided as a computer program product, which may include a machine-readable medium having stored thereon instructions, which may be used to program a computer or other electronic devices—including but not limited to digital cameras, scanners, and other digital image capture devices, and printers and other digital rendering devices—to perform a process according to an embodiment of the present invention. The machine-readable medium may include, but is not limited to, floppy diskettes, optical disks, CD-ROMs, and magneto-optical disks, ROMs, RAMs, EPROMs, EEPROMs, magnetic or optical cards, flash memory, or other type of media/machine-readable medium suitable for storing electronic instructions. Moreover, embodiments of the present invention may also be downloaded as a computer program product, wherein the program may be transferred from a remote computer to a requesting computer by way of data signals embodied in a carrier wave or other propagation medium via a communication link (e.g., a modem or network connection).

Various embodiments of the present invention have been described above in the context of color correcting digital images and illustrated with the specific example of how the invention would work with a facial recognition scheme. However, the invention is not limited to color correction or to facial recognition. The invention instead applies to correcting any characteristic of a digital image by comparing the pixel characteristics of a unique subject with those of the same subject in a different reference image. Furthermore, the present invention is not limited to digital photography, but is also applicable to digital video, or other digital moving image technology, as would be apparent to one skilled in the art. Also, the present invention related to the processing of digital images, and is therefore equally applicable to processes where aspects of image capture, rendering, or both are performed using analog methods. Images corrected using an embodiment of the present invention may also undergo additional processing, digital or otherwise. Such processing also does not make the present invention inapplicable.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. A method for color-correcting a current image comprising:
   identifying a unique person in the current image by using an automated facial recognition scheme;
   selecting a reference image from a plurality of stored images, the reference image including the identified person, by using an automated facial recognition scheme;
   determining a current skin color of the person in the current image;
   determining a reference skin color of the person in the reference image;
   calculating a color correction function by comparing the determined current skin color with the determined reference skin color; and
   color-correcting the current image using the color correction function.

2. The method of claim 1, wherein the color correction function comprises a plurality of transfer functions, the transfer functions each determining the color correction for a color channel in a colorspace.

3. The method of claim 1, further comprising:
   selecting a second reference image including the identified person using an automated facial recognition scheme;
   determining a second reference skin color of the person in the second reference image;
   calculating the reference skin color by combining the skin colors from the reference images.

4. The method of claim 1, further comprising:
   selecting a second reference image including the identified person using an automated facial recognition scheme;
   comparing a capture date of the reference image with a capture date of the current image;
   comparing a capture date of the second reference image with the capture date of the current image;
   selecting at least one of the reference images based on the comparison.

5. An apparatus comprising:
   a bus;
   at least one memory coupled to the bus, the at least one memory storing a current image, at least one reference image, and instructions;
   a processor coupled to said bus, the processor operable to execute the instructions, the instructions causing the processor to perform operations comprising:
   identifying a unique person in the current image by using an automated facial recognition scheme;
   selecting a reference image from a plurality of stored images, the reference image including the identified person, by using an automated facial recognition scheme;
   determining a current skin color of the person in the current image;
   determining a reference skin color of the person in the reference image;
   calculating a color correction function by comparing the determined current skin color with the determined reference skin color; and
   color-correcting the current image using the color correction function.

6. The apparatus of claim 5, wherein the color correction function comprises a plurality of transfer functions, the transfer functions each determining the color correction for a color channel in a colorspace.

7. The apparatus of claim 5, wherein the instructions further cause the processor to perform operations comprising:
   selecting a second reference image including the identified person using an automated facial recognition scheme;
   determining a second reference skin color of the person in the second reference image;
   calculating the reference skin color by combining the skin colors from the reference images.

8. The apparatus of claim 5, wherein the instructions further cause the processor to perform operations comprising:
   selecting a second reference image including the identified person using an automated facial recognition scheme;
   comparing a capture date of the reference image with a capture date of the current image;

comparing a capture date of the second reference image with the capture date of the current image;

selecting at least one of the reference images based on the comparison.

9. A machine-readable medium having stored thereon data representing sequences of instructions that, if executed by a processor, cause the processor to:

identify a unique person in the current image by using an automated facial recognition scheme;

select a reference image from a plurality of stored images, the reference image including the identified person, by using an automated facial recognition scheme;

determine a current skin color of the person in the current image;

determine a reference skin color of the person in the reference image;

calculate a color correction function by comparing the determined current skin color with the determined reference skin color; and color-correct the current image using the color correction function.

10. The machine-readable medium of claim 9, wherein the color correction function comprises a plurality of transfer functions, the transfer functions each determining the color correction for a color channel in a colorspace.

11. The machine-readable medium of claim 9, wherein the instructions further cause the processor to:

select a second reference image including the identified person using an automated facial recognition scheme;

determine a second reference skin color of the person in the second reference image;

calculate the reference skin color by combining the skin colors from the reference images.

12. The machine-readable medium of claim 9, wherein the instructions further cause the processor to:

select a second reference image including the identified person using an automated facial recognition scheme;

compare a capture date of the reference image with a capture date of the current image;

compare a capture date of the second reference image with the capture date of the current image; and select at least one of the reference images based on the comparison.

* * * * *